2 Sheets—Sheet 1.

O. P. STEVENS.

Hulling and Scouring Machine.

No. 1,923.

Reissued March 28, 1865.

Attest
A. Burridge
W. McClelland

Inventor
Oliver P. Stevens.

N. PETERS. Photo-Lithographer, Washington, D. C.

2 Sheets—Sheet 2.

O. P. STEVENS.

Hulling and Scouring Machine.

No. 1,923. Reissued March 28, 1865.

Attest.
W. H. Burridge
A. W. McClelland

Inventor.
Oliver P. Stevens

N. PETERS, Photo-Lithographer, Washington, D. C.

UNITED STATES PATENT OFFICE.

OLIVER P. STEVENS, OF CLEVELAND, OHIO.

IMPROVEMENT IN HULLING AND SCOURING MACHINES.

Specification forming part of Letters Patent No. 15,269, dated July 1, 1856; Reissue No. 1,923, dated March 28, 1865.

*To all whom it may concern:*

Be it known that I, OLIVER P. STEVENS, of Cleveland, in the county of Cuyahoga and State of Ohio, have invented a new and improved mode of constructing hulling or scouring machines for grain, seeds, &c., and pulverizing friable substances; and I do hereby declare that the following is a full, clear, and exact description of the construction and operation of the same, reference being had to the annexed drawings, making a part of this specification, in which—

Figure 1:
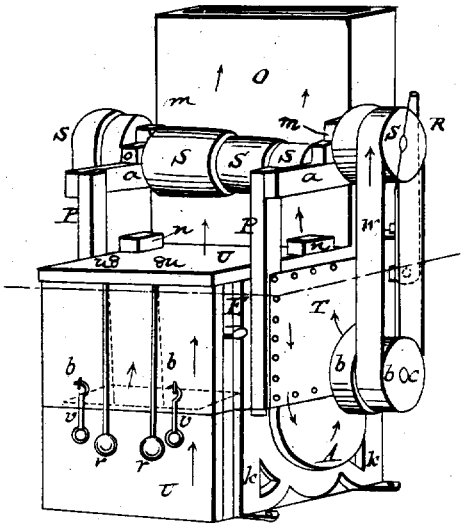
Figure 3:
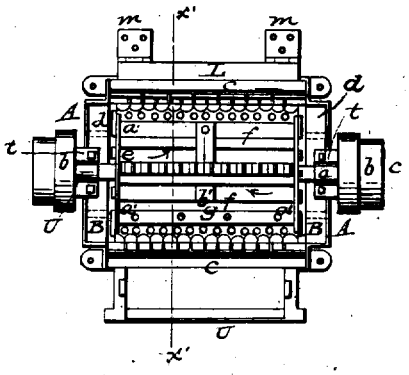
Figure 2:
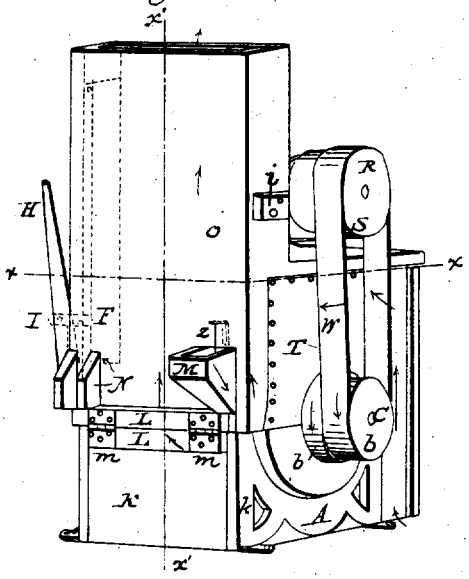
Figure 4:
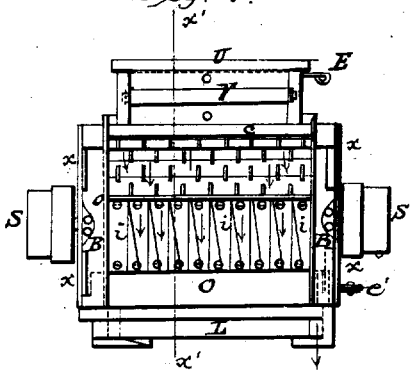
Figure 5:
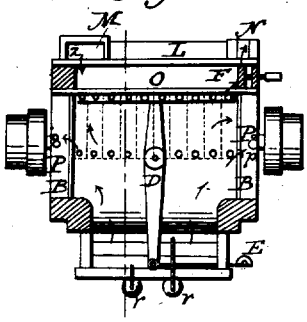
Figure 7:
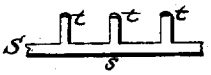
Figure 8:
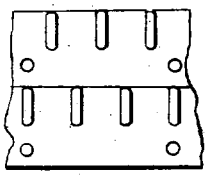
Figure 6:
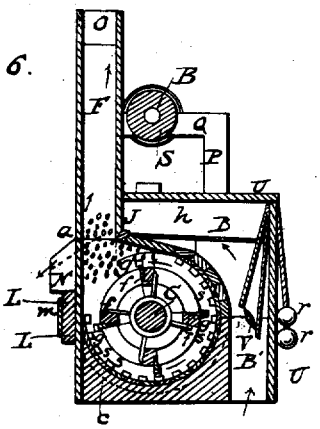
Figure 9:
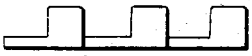
Figure 10:
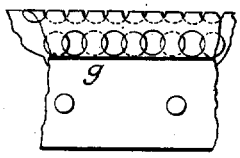
Figure 11:
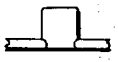
Figure 12:
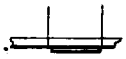
Figure 13:
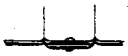
Figure 14:
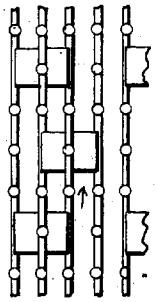
Figure 15:
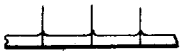

Figure 1, Plate 1, is a perspective view. Fig. 2 is a perspective view of the sides opposite those shown in Fig. 1. Fig. 3 is a plan view of the lower section. Fig. 4 is a plan view of the upper section inverted. Fig. 5, Plate 2, is a plan view of the middle section, taken at the horizontal line *x x*, Fig. 2. Fig. 6 is a vertical section in the direction of the line *x′ x′*. Fig. 7 is an edge view of a detached section of the lining to the fan or beater wheel casing, which is studded with teeth. Fig. 8 is a plan view of two detached sections of the same. Fig. 9 is an end view of three sections studded with teeth. Fig. 10 is a detached section of two perforated metallic plates for arming the fan or beater wheel. Fig. 11 is a side view of a steel tooth set in cast-iron. Fig. 12 is an edge view of two thin teeth, in the form of a staple, set in leather. Fig. 13 is an edge view of the same, set in sheet-iron and fastened with a rivet. Fig. 14 is a plan view of the same, fastened in place with strips of sheet or hoop iron, which pass over the horizontal part and are fastened with nails or screws driven into the spaces between them—one nail or screw is through each staple. Figs 11, 12, 13, 14, and 15 represent different modes for lining and providing the fan or beater wheel casing with thin metallic teeth.

A A, Figs. 1, 2, and 3, represent cast-iron heads to the lower section of the fan or beater wheel casing, with flanges to support the cylindrical part *c*, which is made of wood, and is fastened with screws or bolts.

*a′ a′* represent the cast-iron heads to the upper section of the fan or beater wheel casing, with flanges to support the wood casing *c*, Fig. 4, and is fastened with screws or bolts. There are semicircular openings in the upper edges of the fan or beater wheel casing heads *a′ a′*, to admit air to the fan or beater wheel.

*d d* represent semicircular sheet-iron plates with semicircular openings in the upper edges, Fig. 3, for admitting air to the fan or beater wheel, as indicated by the red arrows. Said plates are riveted to the cast-iron heads A A at their peripheries, and are connected with these heads by ties. Represented by dotted lines, Fig. 3.

C represents the fan or beater wheel shaft, which is supported in boxes cast on the heads A A, and has graduated pulleys *b b* on each end.

*t t* represent caps with cups, to receive the tubes *p p*, Fig. 5.

*e e* represent wheels on the shaft C, with flanges *d* on both sides of the rims. Those on the outside are to prevent hulls, dust, &c., from passing from their peripheries toward the shaft C. Those on the inside support wooden fans *f f f f*, which are supported in the middle by the spider *b*. The wheels and spider are fastened to the shaft C in the usual way and to the fans or beaters *f f f f* with screws or bolts.

*g*, Fig. 10, represents pieces of perforated metallic plates fastened to the fans or beaters *f f f f* with screws or bolts. The fan or beater wheel casing *c c* is lined with cast-iron strips or other material, set with teeth, as seen in Figs. 7, 8, 9, 11, 12, 13, and 15.

*i i* represent metallic guides or deflectors having a flange at their upper edges, which has sufficient width at their lower ends to receive screws to hold them in place to the under side of the board *h*, the flange, at the proper distance from their upper ends, having oblong holes, so they can be moved when connected to the rod J, which has a notch in the upper edge to receive the lever D, which has a rod, E, attached for moving the guides *i i*, as indicated by the red lines, Fig. 4. The board *h* is lined or covered on the under side with sheet-iron, which projects under the rod J to the chimney-space. There are long holes in this sheet-iron lining for the screws that hold the guides *i i* to the rod J so they can be moved.

F represents a valve, Figs. 2 and 6, supported at the upper end by a pin or hinge-joint.

H represents a lever, connected to the machine at the lower end by a link, *e*, and to the valve F by the latch I, to catch upon, as seen in Fig. 2, to hold the valve F open or shut.

K represents a board to support the legs *k k*. The opposite side of the machine is made in the same manner. The legs have feet, with holes in them, through which screws or bolts pass to fasten the machine to the floor.

L L represents stiffening-pieces, to which the hinges *m m* are fastened.

M represents a hopper shaped spout with a slide-valve in it. There is also a swing-valve, which is opened by the pressure of the grain, to prevent the escape of air.

N represents the discharge-spout, which has a valve that is opened by the pressure of the grain.

O represents the chimney, which should be lined with sheet-iron to a point a little above where the grain or other substance strikes.

P P represent supports to the bridge-trees *a a*, which support the shaft R and are screwed to the chimney O at their opposite ends. The said supports extend down a little below the center of the fan or beater wheel casing and are fastened to the cast-iron heads *g g*.

R represents an auxiliary shaft, with graduated pulleys *s s s* between its bearings.

T T represent sheet-iron casings, which have pieces of sheet-iron riveted to their lower edges on the inside, forming grooves *x x*, Fig. 4, to receive the upper edges of the cast-iron heads A A for inclosing the chambers B B. The tubes *p p*, Fig. 1, for tallow and oil, are supported near their lower ends by iron straps riveted to the inside of the sheet-iron casings T T.

*n n* represent covers to the tubes *p p*.

*m′ m′* represent covers to short tubes in the caps *o o*, Fig. 1.

U represents the wood casings forming the air passages or chambers B B.

V represents a valve, (Figs. 4 and 6,) with cords and weights *r r* attached. The right-hand one opens the valve V, which is held in position by winding the cords around the pins or screws *u u*, Fig. 1.

*v v* represent hooks and eyebolts.

The black arrows (Figs. 2, 4, 5, and 6) indicate the passage of the grain, seeds, &c., and also the direction in which the fan or beater wheel is driven.

W W represent the belts by which the fan or beater wheel is driven.

The red arrows, Figs. 5 and 6, indicate the direction of the current of air to the fan or beater wheel, which should have a space between it and the teeth in the fan or beater wheel casing of from three-eighths to half an inch for hulling and scouring grain. The holes along the edges of the fans or beaters *f f f f* should be from five-sixteenths to three-eighths of an inch for wheat, and from one-half to five-eighths of an inch for corn, or else put on with the smallest ends of the holes forward, and for nuts they should be proportionally larger, according to their size, and there should be a corresponding modification in the other parts of the machine to receive the largest-sized nuts or the largest-sized pieces to be pulverized.

The length of the machine should be from three to four diameters of the fan or beater wheel, and there should be as many fans or beaters in the wheel as it is inches in diameter for hulling or scouring grain. For pulverizing friable substances it admits of numerous modifications in the number and form of the beaters and their velocities. The lining of the casing is also susceptible of many modifications.

In the construction of this machine I do not intend to confine myself to any particular size as to the whole or any of its parts, nor to any particular kinds of materials used.

The operation of this machine on grain, seeds, &c., is as follows: The auxiliary shaft R and pulleys S *s* are put in motion by a belt around one of the pulleys *s s s*, which gives motion to the fan or beater wheel *e f g* by the belts W W. The upper ends of the guides *i i* are moved toward the valve F by pushing in the rod E. The grain is put into the hopper-shaped spout M, Fig. 2. Draw the valve *z*, and the grain will slide into the hulling, scouring, and pulverizing chamber. The current of air put in motion by the fan or beater wheel moves the grain among the teeth in the direction indicated by the black arrows, Fig. 6. The sheet of grain is continually divided to the right and left by the teeth, causing it to act upon itself as well as against the teeth and to fly so as to come in collision with the perforated fans or beaters, when some of it passes through the holes and is thrown by centrifugal force against and among the teeth until it is carried over the fan or beater wheel and is thrown between the guides *i i* and against the vertical face of the chimney O. From thence it rebounds and falls down through the constant stream of grain following after. It now gets more action of grain against grain when it goes another round of the fan or beater wheel casing, and is caused to advance more or less at each revolution of the fan or beater wheel, according to the position of the guides *i i*, until it has passed to the end of the fan or beater wheel casing, when it is discharged over the upper edge of the fan or beater wheel casing-head *a*, and out through the spout N, as indicated by the black arrows in Figs. 2, 4, 5, and 6, after the hulls, dust, &c., have been separated from it by the constant current of air passing up through the chimney O. Said current of air can be regulated by the valve V in the vertical trunk B′.

The velocity at the periphery of the fan or beater wheel should be from thirty-four to forty feet per second for hulling and scouring wheat. For hulling cotton-seed and making hominy it requires about fifty feet per second, and for making grits a still greater velocity, according to the size of grits required.

For pulverizing friable substances the machine may be reduced to its simplest form, viz: the shaft, pulley, armed casing, chimney, and beater-wheel.

The opening in the casing *c*, to admit the material to be pulverized, should be on its side, at or near the center, so that air will pass in to carry the pulverized material up the chimney O.

The several parts of the machine should be made strong, according to the size of the pieces to be reduced. A velocity of one hundred and eighteen feet per second at the periphery of the beater-wheel will pulverize quartz pebbles sufficiently. A much higher velocity may be had with safety when the machine is properly constructed and tended.

The strength of the current of air up the chimney O may be lessened by having the beaters project from the face of a smooth cylinder or disk. A series of pulverizing-chambers may be used in connection, for the reason that the current of air up the chimney O is more or less strong, according to its size and that of the opening to admit the material to be pulverized.

Beater-wheel No. 1 may have from three to four beaters; beater-wheel No. 2, four to eight; beater-wheel No. 3, twelve to sixteen beaters; and they may be solid or perforated, as the nature of the work to be done may require, without changing the principle of operation, and the casing may be provided wth a zigzag or corrugated surface in its inner periphery, in lieu of teeth, as described.

The material discharged from pulverizing, casing No. 1 which is not fine enough can pass down into pulverizing-casing No. 2, then up as before, and then down into pulverizing-casing No. 3, where no air should enter except what is mingled with the material, and if any should escape that is not reduced to the proper fineness, it can be separated, and the coarse can be returned into the same or another pulverizing-casing, and so on as far as experience may dictate.

The separation of the coarse can be made by discharging from the chimney O in a horizontal direction into a settling-room, where the coarse will fall first, and the separation can be made at any grade of fineness desired.

What I claim as my discovery or invention, and desire to secure by Letters Patent, is—

1. The use or employment of perforated revolving fans or beaters for the purposes of hulling or scouring grain, seeds, &c.

2. Lining and arming the fan or beater wheel casing with teeth, substantially as described, for the purposes set forth.

3. The arrangement of the upper section of the fan or beater wheel casing *c* in relation to the chimney O, in combination with the fans or beaters *f g* and guides *i i*, combined as described, and operating in the manner and for the purpose hereinbefore described.

4. The adjustable guides *i i*, combined as described, and operating in the manner and for the purpose hereinbefore described.

5. The air passages or chambers B B, arranged in each end and on top of the fan or beater wheel casing, in combination with the vertical trunk B′, as herein described and for the purposes specified.

6. The valve F, operated in the manner described, in combination with the chimney O, for the purpose specified.

7. Pulverizing friable substances by means of revolving beaters surrounded with a casing, substantially as described.

OLIVER P. STEVENS.

Witnesses:

W. H. BURRIDGE,

A. W. MCCLELLAND.